United States Patent [19]
Wind et al.

[11] Patent Number: 5,296,776
[45] Date of Patent: Mar. 22, 1994

[54] PIEZO-ELECTRIC MOTOR INTENDED FOR A TIMEPIECE

[75] Inventors: Hans M. Wind, Roggwill; Christian Péclat, Granges, both of Switzerland

[73] Assignee: ETA SA Fabriques d'Ebauches, Granges, Switzerland

[21] Appl. No.: 855,922

[22] Filed: Mar. 23, 1992

[30] Foreign Application Priority Data

Mar. 28, 1991 [CH] Switzerland ............... 00949/91-3

[51] Int. Cl.[5] ............................................. H01L 41/08
[52] U.S. Cl. ..................................... 310/323; 310/328
[58] Field of Search ................................. 310/323, 328

[56] References Cited

U.S. PATENT DOCUMENTS

| | | | |
|---|---|---|---|
| 3,595,007 | 7/1971 | Baker | 310/323 X |
| 4,453,103 | 6/1984 | Vishnevsky et al. | 310/323 |
| 4,742,260 | 5/1988 | Shimizu | 310/323 |
| 4,814,660 | 3/1989 | Yamada | 310/328 |
| 4,959,580 | 9/1990 | Vishnevsky et al. | 310/323 |

FOREIGN PATENT DOCUMENTS

| | | | |
|---|---|---|---|
| 0817815 | 4/1981 | U.S.S.R. | 310/323 |
| 0817816 | 4/1981 | U.S.S.R. | 310/323 |
| 0968868 | 10/1982 | U.S.S.R. | 310/323 |
| 2044014 | 3/1979 | United Kingdom . | |

OTHER PUBLICATIONS

"New-Type Ultrasonic Motor", Techno Japn, vol. 19-No. 5, May 1986 pp. 67-69.
Electronic Timepiece, Patent Abstracts of Japan, vol. 012, No. 370 (p-.767), Oct. 5, 1988.

Primary Examiner—Mark O. Budd
Attorney, Agent, or Firm—Weil, Gotshal & Manges

[57] ABSTRACT

This motor of the piezo-electric type comprises a stator (1) and a rotor (15) intended to effect relative movement to one another. The stator (1) comprises a plate (17) of generally planar form and means for generating therein vibratory waves at an ultrasonic frequency. Such waves enable the imparting of an elliptic motion to at least one active point (17c) on the periphery of the plate in the plane of the latter, said active point being in engagement with a motion transmission surface (22) of the rotor (15) in order to bring about movement of the rotor (15) relative to the stator (1) by virtue of the elliptic motion. The plate (17) of generally planar form includes a central circular portion (17a), to one of the faces of which are attached the means for generating the vibratory waves. From this central portion extend at least two lobes (17b) on the edges (17d) of which are arranged said active points (17c). The lateral edges (17d, 17e) of lobes (17b) are profiled so as to concentrate the vibratory energy emanating from the central portion (17a) within the active points (17c). Thus one of these edges preferably exhibits an elliptical profile. The invention is applicable to motors intended to furnish a low couple with a high yield, in particular in the horological domain.

7 Claims, 6 Drawing Sheets

PIEZO-ELECTRIC MOTOR INTENDED FOR A TIMEPIECE

BACKGROUND OF THE INVENTION

The present invention relates to motors in which a rotational movement is generated by means of an ultrasonic piezo-electric effect. More precisely, the invention concerns micromotors of the piezo-electric type comprising two elements intended to effect relative movement to one another and forming respectively a stator and a rotor of the motor, said elements each exhibiting an active surface which, in the course of said relative movement, is placed facing the active surface of the other element, one of such elements being provided with piezo-electric means intended to generate vibratory waves in such element capable of imparting elliptic motions to points on the active surface of such element, such points, in bearing on the active surface of the other element, bringing about such relative movement.

Such a motor is described in an article appearing in the review "Techno Japan" Vol. 19-No. 5, May 1986. This motor includes a stator in the general form of a disc and consisting of two flat connected elements, one being in stainless steel and the other of piezo-electric material. On the visible face of the stainless steel element is arranged a ring, a series of small blocks separated from one another and concentric to the axis of the stator disc. The rotor of this motor also exhibits the form of a disc which is rotatably mounted coaxially to the stator in a manner such that one of its faces rests on the free face of the stator blocks. Such rotor, which is also formed in stainless steel, includes in the zone facing the stator blocks a ring of plastic material offering a high coefficient of friction.

When the piezo-electric element of the stator is excited, it produces a progressive wave in the stator blocks which is propagated in a circular manner along the blocks so that each of the points of the blocks facing the rotor effects a very small axial motion combined with an annular motion according to a composite elliptic motion which, applied to the friction ring of the rotor, causes the latter to advance in rotation around the axis of the motor.

Given that the amplitude of motion of the points of the stator blocks is extremely small, in order that a perceptible power may be taken off the axis of the rotor, such amplitude should be greater than the irregularities in the surface of the blocks which face the rotor. Now, such amplitude is on the order of a micron or some microns so that it is necessary to machine such surfaces with an extreme precision.

Another disadvantage of this motor is that it is necessary to employ two pairs of excitation electrodes for the piezo-electric element energized by out-of-phase electric potentials, otherwise it is not possible to generate a progressive wave in the stator. This requirement complicates the energization circuit of the motor and thus increases the cost thereof.

Finally, the known motor is not very readily adapted to the transmission of low value couples as would be desirable in horological applications for instance since, under these conditions, the yield is mediocre.

Another construction of a piezo-electric micromotor is described in the journal IEEE, 1989, pages 735 to 738, by T. Takano, Y. Tomikawa, T. Ogosawara and H. Hirata. The article in question entitled: "Construction and characteristics of ultrasonic motors using piezoceramic annular plates", describes a motor including a first element exhibiting a generally planar form and associated with means intended to generate therein vibratory waves at an ultrasonic frequency enabling the imparting of elliptical motions to active peripheral points of such elements within its plane.

Each active point is in engagement with a motion transmission surface of a second element of annular form placed around the first element in order to bring about a movement of the second element relative to the first element by virtue of said elliptical motion.

This known construction, although it is capable of transmitting a power greater than that which it is possible to transmit in the construction discussed hereinabove, also presents the disadvantage of necessitating an extreme precision in the outer surface of the vibrating element and of the profile of the active surface of the annular element, the two elements having to be adjusted so that there exist practically no play between the two, while nevertheless permitting a relative motion between them.

Furthermore, such motors have the same disadvantages as the motor of the prior art discussed hereinabove, namely they require a two-phase energization voltage and exhibit low yield when they are conceived for the transmission of low couples.

The invention has as its purpose to provide a piezoelectric motor of the general type described hereinabove, but avoiding the cited disadvantages.

SUMMARY OF THE INVENTION

The invention thus has as its object a motor of the piezo-electric type comprising two elements intended to effect relative movement to one another and respectively forming a stator and a rotor, a first of such elements exhibiting a generally planar form and comprising means for generating vibratory waves therein at an ultrasonic frequency enabling the imparting of an elliptic motion to at least one active point on the periphery in the plane of such first element, said active point being in engagement with a motion transmission surface of the second element, in order to bring about movement of said second element relative to said first element by virtue of said elliptic motion, characterized in that said first element includes a central portion of generally circular form to one of the faces of which are attached the means for generating vibratory waves, from which central portion extend at least two lobes on the edges of which are arranged said active points and in that the lateral edges of said lobes are profiled so as to concentrate the vibratory energy emanating from said central portion within said active points.

Thanks to these characteristics, the manufacture of the motor is considerably simplified since it suffices hereinafter to assure the dimensional precision of the first element only at the location of the active points, while by means of an appropriate profile of the lobes of this element, the energy may be concentrated sufficiently within such points. The transmission of vibratory energy from the first element to the second element is then clearly superior to that in the case of the prior art, the useful couple of the motor being that much more increased.

Other characteristics and advantages of the invention will appear in the course of the description to follow given solely by way of example and made in referring to the attached drawings.

DESCRIPTION OF THE PREFERRED EMBODIMENTS

Figure 1:
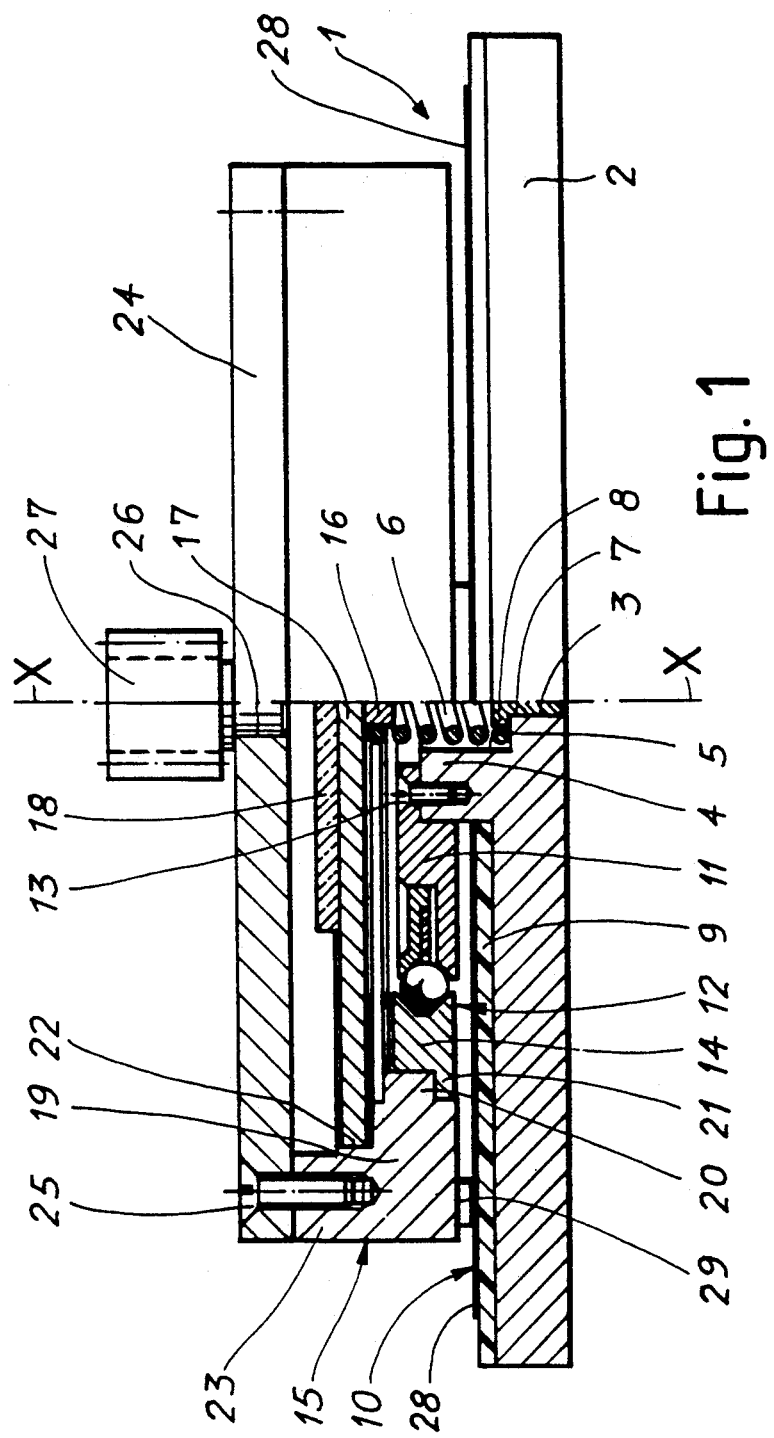
FIG. 1 shows an elevational view, half in crosssection and half seen from the exterior, of a first embodiment of the piezo-electric motor according to the invention.
Figure 2:
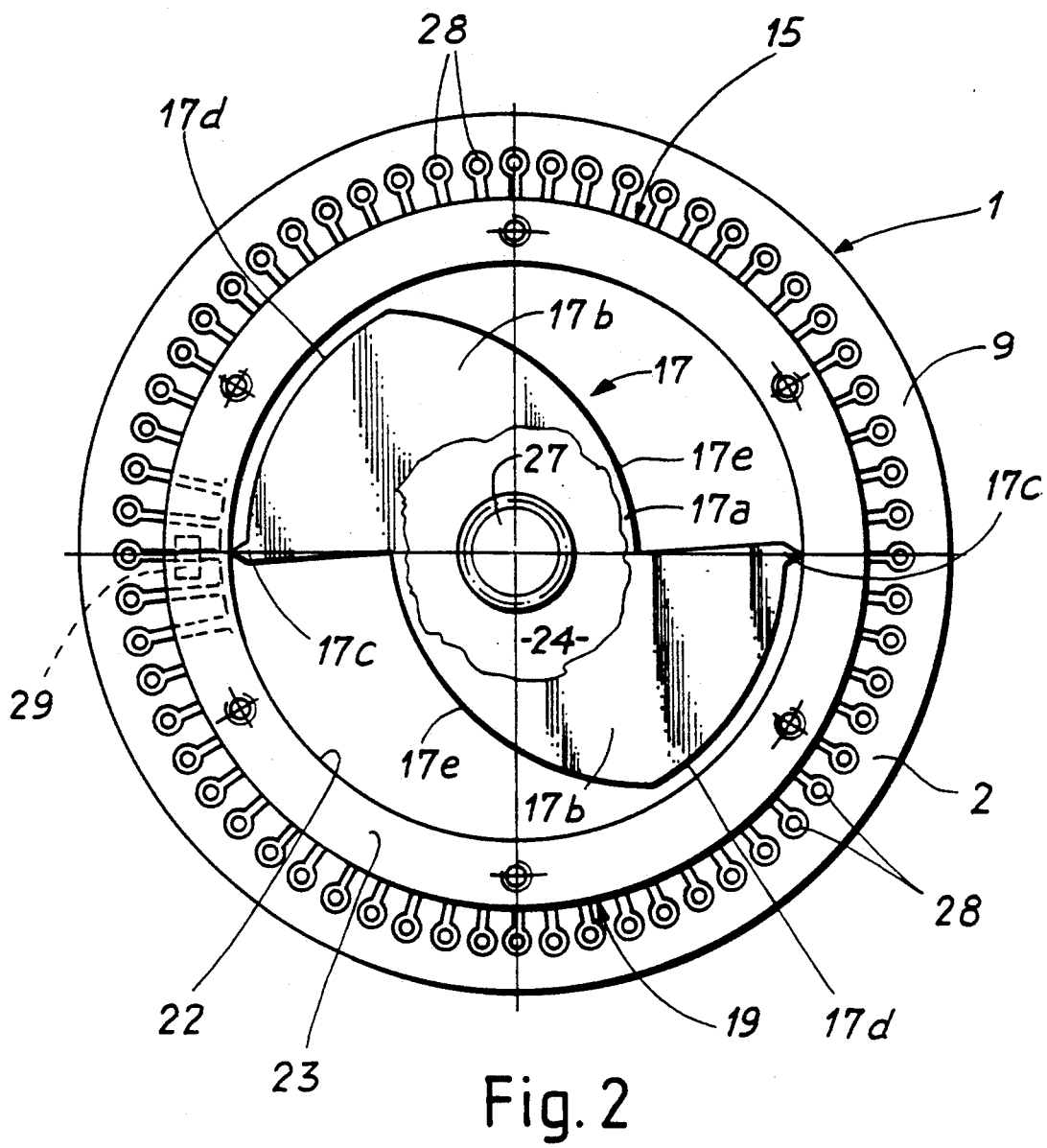
FIG. 2 shows a plan view of such motor from which has been removed the cover plate provided with its output pinion.

Reference will be had initially to FIGS. 1 and 2 which represent a first embodiment of the piezo-electric motor according to the invention.

This motor comprises a stator 1 comprising a base plate 2 of generally circular form around axis X-X and pierced at its center by a hole 3. The base plate 2 shows an annular central rib 4 bounding a cavity 5 of cylindrical form intended to accommodate a helical spring 6. This latter is held fixed relative to the base plate 2 by means of a plug 7 driven into the central hole 3 and exhibiting a collar 8 around which is clamped the corresponding end of spring 6.

The surface of the base plate 2 on which is mounted the central rib 4 is coated with an insulating material 9 on which is printed an electric circuit 10 the purpose of which will appear hereinafter.

A ring 11 which constitutes the internal raceway of a ball bearing 12 is fastened to the central rib 4 by means of fastening screw 13. The bearing 12 also includes an outer race 14 fixed to the rotor 15 of the motor.

The helical spring 6 belonging to the stator projects axially beyond the central annular rib 4 and receives at its free end a fastening piece 16 which is clamped thereto by virtue of the stiffness of spring 6. The fastening piece 16 is soldered to a resonance plate 17 of generally planar form extending radially relative to axis X—X of the motor.

On the face of such resonance plate 17 opposite to the fastening piece 16 is glued a ceramic piezo-electric element 18 of circular form and centered on axis X-X.

Figure 4:
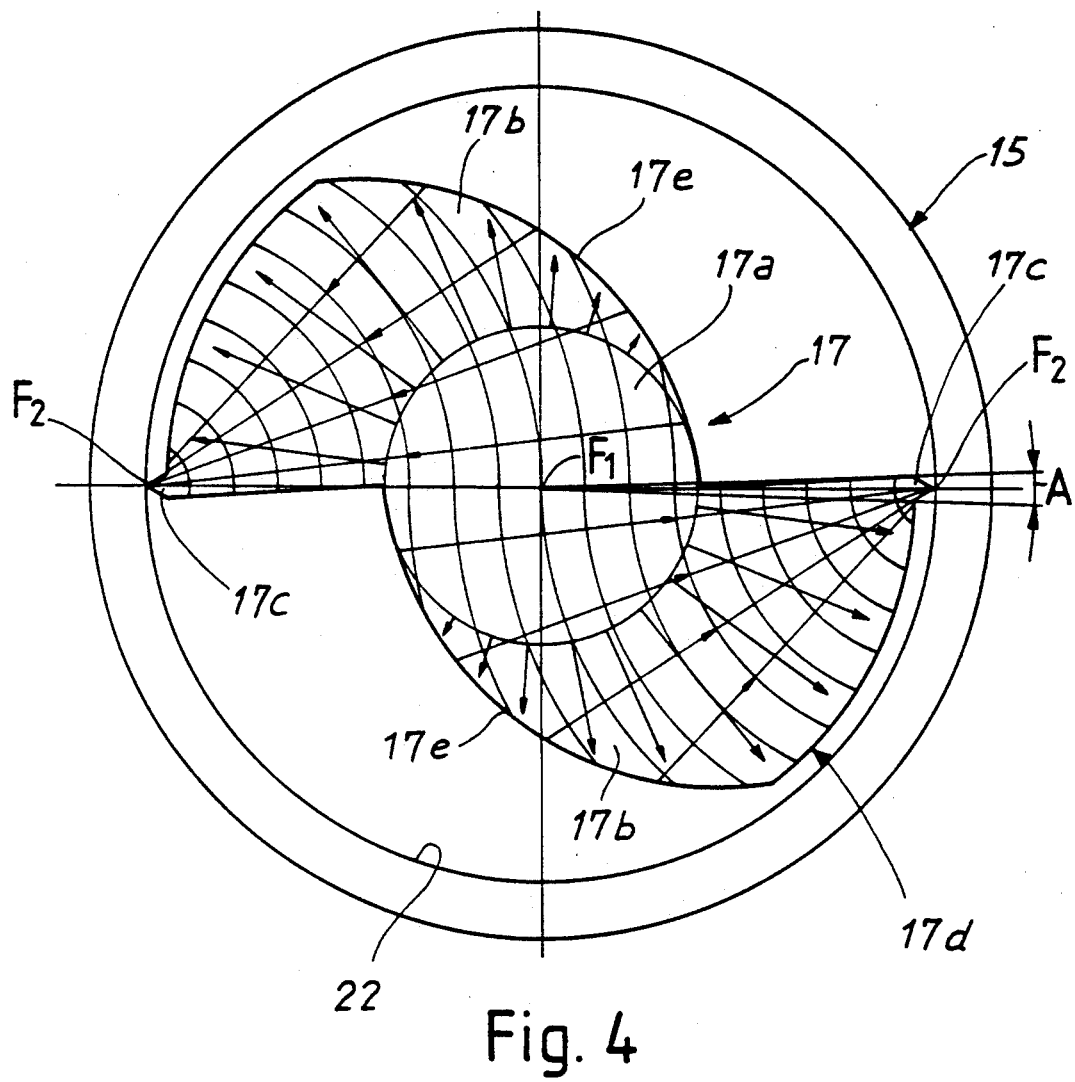
FIG. 4 shows schematically the path of the vibratory waves propagating in the stator of the motors shown on FIGS. 1 to 3.

On FIGS. 2 and 4 it is seen that the resonance plate 17 includes a central portion 17a from which two lobes 17b extend radially towards the exterior, each of which ends with an active point 17c.

Each lobe 17b is bounded by a circular edge 17d which follows the internal perimeter of the rotor 15 at a constant radial distance and by an edge of elliptical form 17e, the two foci F1 and F2 of which are respectively situated at the center of plate 17 and at the peak of point 17c (FIG. 4).

Rotor 15 essentially comprises an outer ring 19 the inner annular surface of which is stepped. At the side of the base plate 2 such ring exhibits thus a radial annular boss 20 forming an axial shoulder against which bears an outer collar 21 of the outer race 14 of the ball bearing 12. The ring further exhibits an axial annular boss 22 which forms the motion transmission surface of rotor 15 cooperating with the active points 17c of stator 1.

The diameter of the annular boss 22 or motion transmission surface is exactly matched to the distance separating the summits of the active points 17c. It will be noted that such distance may be easily matched with precision by suitably fashioning the summits of points 17c. There thus results at this level easy manufacture of the motor according to the invention in contrast to that of the motors of the prior art.

The ring 19 of the rotor further comprises an annular flange 23 the radial end surface of which serves as a support surface for a cover plate 24 mounted on ring 19 by screws 25.

At the center of the cover plate 24 is provided an opening 26 into which is driven a pinion 27 which is intended to assure transmission of the output couple of the motor.

FIG. 2 shows that the printed circuit 10 exhibits a certain number of contacts 28 extending radially towards the exterior and cooperating with a rubbing contact 29 provided on the surface of the rotor turned towards the printed circuit 10. This arrangement enables the obtaining of a stepping function of the motor by means of an appropriate energization circuit connected to the piezo-electric plate 18, the stopping thereof being brought about each time that the rubbing contact is displaced from one radial contact 28 towards another. If the motor is intended to be employed in a timepiece, which is one of the preferred applications, the number of radial contacts is advantageously equal to 60. Nevertheless, the motor may also be employed in a continuous mode, in which case the printed circuit and its associated rubbing contact may be omitted.

Figure 3:
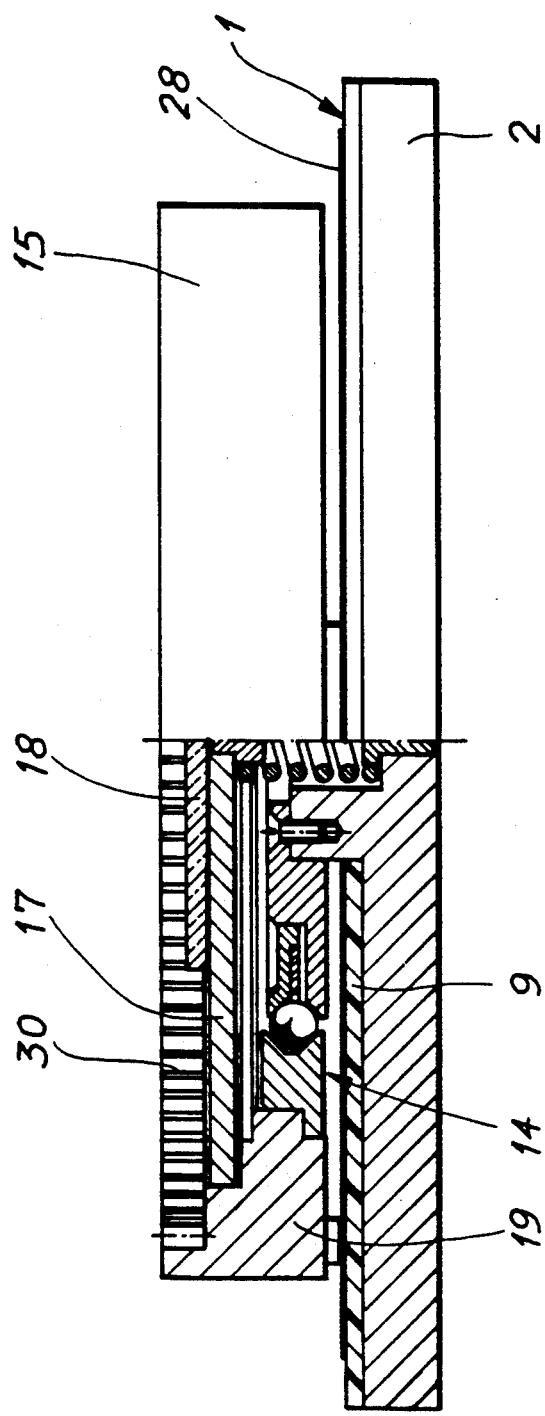
FIG. 3 shows an elevational view, half in cross-section and half from the exterior, of a second embodiment of the piezo-electric motor according to the invention.

FIG. 3 represents another embodiment of the motor according to the invention similar in all points to that of the embodiment of FIGS. 1 and 2 except for the fact that the motion output is somewhat different. Effectively, in this case, the motor is not provided with a cover plate while the annular flange 23 is interiorly machined in a manner to assume the form of a crown with internal teeth 30. With such teeth may mesh a pinion (not shown) of a gear train serving to transmit the movement of rotation of rotor 15.

The operation of this motor is as follows:

The piezo-electric element 18 being subjected to an electrical potential through its two electrodes (not visible on the drawings), it generates a cylindrical elastic wave which is transmitted towards the resonance plate 17. The center of emission of the wave is located at focus F1 (see FIG. 4) of the elliptical edges 17e of the resonance plate 17 and thus coincides with the axis X—X of the motor. The elastic wave is reflected by the elliptical edges 17e and, thanks to the special geometric form of such edges, such wave is concentrated at the second focus F2 of the elliptical edges 17e, that is to say, the peaks of the points 17c of the resonance plate 17. A part of the cylindrical wave is propagated towards the circular edges 17d of such plate where it is reflected in the direction of the emission center of the wave, namely focus F1 of the elliptical edges 17e.

Figure 5:
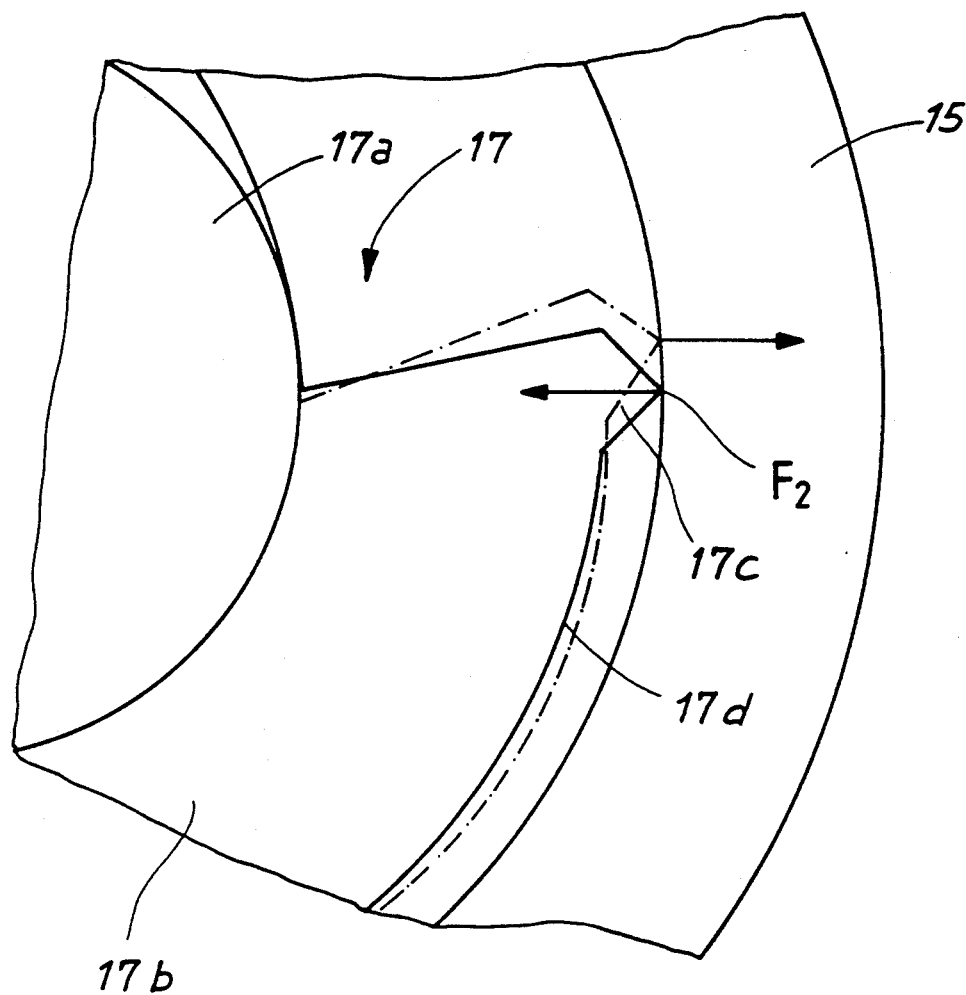
FIG. 5 shows a partial schematic view of the active end of one of the lobes of the first element and more precisely of the path of motion executed by the active point of such lobe in the course of each operating cycle of the motor.

There results therefrom that the peaks of the two points 17c of the resonance plate effect an elliptical motion which has as effect the driving of rotor 15 (see FIG. 5).

In a prototype made by the applicant, the following dimensions were chosen, it being understood that such values are given here only by way of example:

| | |
|---|---|
| outer diameter of the motor | 10.6 mm |
| internal diameter of the rotor | 10 mm |
| diameter of the stator (edges 17d) | 9.2 mm |
| diameter of element 18 | 5 mm |

Furthermore, it is advantageous to choose a precise value for the base dimension of points 17c the angle A of which, having its summit at the point F1, is preferably chosen to be 5°. The thickness of element 18 is 0.2 mm, the type of ceramic material may be PXE 5 with a natural capacitance Co of 1.8 nF. With an electrical potential applied to the electrodes of the piezo-electric element of 3 V, the energy furnished to the system is of 3.2 mJ at a frequency of 400 kHz.

The resonance plate 17 must be formed of a material the acoustic impedance of which approaches as closely as possible that of the piezo-electric element 18 in order that transmission of the vibratory wave be as efficient as possible. Furthermore, such material should have good wear resistance. Although materials such as Durimphy, steel, tempered or not, copper-beryllium, brass or nickel silver are usable, it has been confirmed that the best results may be obtained with aluminium. However, it is necessary to treat plates manufactured from this material so that they exhibit the required properties of resistance and eventually of weldability, a nickel plating followed by gilding of the central portion and addition of an oxide layer to points 17c being the operations suitable to this end.

Given the non-synchronous characteristic of the motor according to the invention, the latter preferably includes the arrangement for detecting the position shown on FIGS. 1 to 3 as described hereinabove. The advantage of this arrangement is that it is simple and uses the same energization as the motor by means of a simple signal forming operation. Simple electronics known to persons skilled in the art enable the motor to operate in a stepping mode at a frequency of 1 to 60 steps per second, with an angular resolution of 6 degrees per step. Thus, the motor in accordance with the invention, is particularly appropriate for horological applications.

To maintain the quality factor of the resonance plate at a suitable value, the latter is preferably mounted on an elastic coupling arrangement which is obtained by way of a non-limiting example by a spring suspension shown on FIGS. 1 to 3. This arrangement has additionally the advantage of compensating eventual errors of concentricity of the construction (bearing/stator, rotor/bearing, fastening of the resonance plate on its spring, etc.) and thus to favour permanent contact of points 17c with the rotor.

Figure 6:
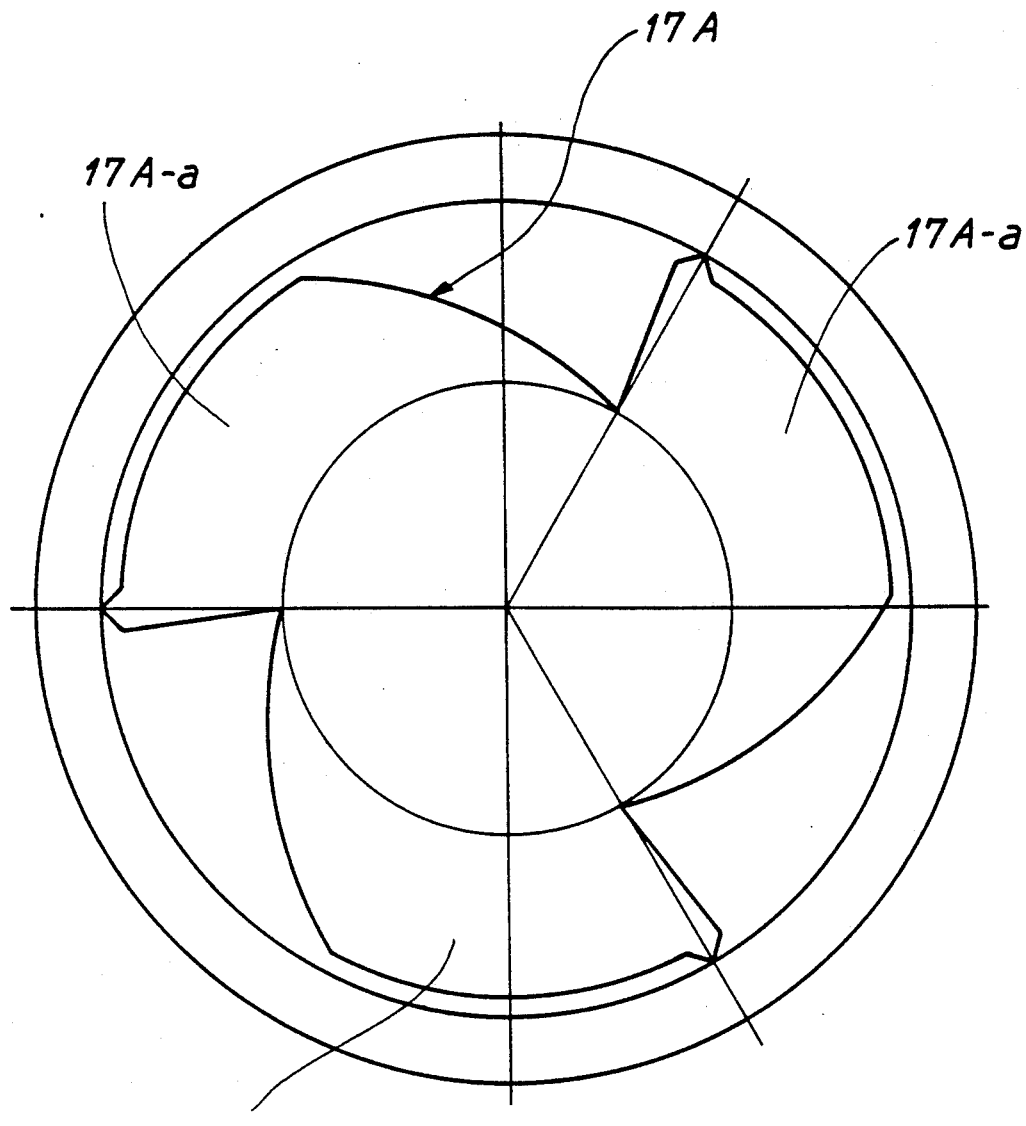
FIG. 6 shows schematically a third embodiment of the invention.

FIG. 6 represents another embodiment of the invention which differs from the preceding embodiments solely in that it includes a resonance plate 17A provided with three lobes 17A-a the active points of which are separated from one another by 120°.

The electrical signal which is applied to the piezo-electric element through two electrodes only, which are provided on the planar faces (and not shown on the figures), has a sinusoidal form at one of the resonance frequencies of the system and may have an amplitude of 3 to 15 volts for instance. The value of the energization voltage acts on the speed of the rotor and may eventually be employed as regulation variable for such speed.

It is however likewise possible to energize the motor according to the invention by means of a signal of squared form having the same frequency as would have the sinusoidal signal replaced thereby. Such a squared signal exhibits the advantage of simplifying the control circuit of the motor. This circuit may thus comprise a bridge having three or four transistors as is well known to persons skilled in the art.

What we claim is:

1. A piezo-electric motor comprising:
   two elements mounted for relative motion with respect to one another in a plane;
   the first of said elements having a generally planar form co-planar with said plane of relative motion and including:
   a generally circular central portion;
   a plurality of lobes extending from said central portion, the majority of the surface area of said lobes being in said plane of relative motion; and
   an active contact point on each of said lobes, said active contact points engaging said second element for imparting relative motion thereto; and
   means mounted on one of the faces of said central portion of said first element for generating vibratory waves therein,
   wherein the lateral edges of said lobes are configured for concentrating the energy of said vibratory waves emanating from said central portion within said active points for imparting generally elliptically motion to said active points for transmitting motion to said second element relative to said first element.

2. A piezo-electric motor as set forth in claim 1 wherein said said stator comprises said first element and said rotor comprises said second element.

3. A piezo-electric motor as set forth in claim 2 wherein said stator comprises a resonance plate on which said lobes and said active points are arranged and wherein said means for generating the vibratory waves comprise a platelet of piezo-electric material fastened to one of the faces of said resonance plate.

4. A piezo-electric motor as set forth in claim 3 comprising a support to which said resonance plate is fastened through an elastic coupling.

5. A piezo-electric motor as set forth in claim 8 wherein said lateral edges of each of said lobes include an edge in the form of an arc of a circle centered on the axis of said central circular portion and facing said second element, and an elliptically profiled edge linked with such circular arc-formed edge said elliptically profiled edge rejoining the other lobe and having a first focus situated on said axis and a second focus coinciding with said active point belonging to such lobe.

6. A piezo-electric motor as set forth in claim 2 wherein said rotor comprises an annular ring on which is interiorly provided said motion transmission surface and wherein said ring is closed by a circular plate into which is driven a pinion for taking off the movement and forming the motor output.

7. A piezo-electric motor as set forth in claim 2 wherein said rotor comprises an annular ring on which is interiorly provided said motion transmitting surface and wherein said ring also comprises a toothed crown intended to mesh with a driving element exterior to the motor, said crown forming the motor output.

* * * * *